United States Patent
Patel et al.

(10) Patent No.: US 7,471,774 B2
(45) Date of Patent: Dec. 30, 2008

(54) METHOD AND SYSTEM OF PAUSING AN IVR SESSION

(75) Inventors: Labhesh Patel, Mountain View, CA (US); Fadi R. Jabbour, Sunnyvale, CA (US); Johnny H. Lee, Mountain View, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 11/013,222

(22) Filed: Dec. 14, 2004

(65) Prior Publication Data

US 2006/0126803 A1 Jun. 15, 2006

(51) Int. Cl.
*H04M 1/64* (2006.01)
(52) U.S. Cl. ...................................... 379/76; 379/88.23
(58) Field of Classification Search .............. 379/88.25, 379/88.23, 88.17, 88.16, 71, 76, 67.1
See application file for complete search history.

(56) References Cited

U.S. PATENT DOCUMENTS

| | | | |
|---|---|---|---|
| 5,850,429 A | 12/1998 | Joyce et al. ................... 379/88 |
| 5,946,388 A | 8/1999 | Walker et al. ................ 379/266 |
| 6,016,336 A * | 1/2000 | Hanson .................... 379/88.23 |
| 6,487,277 B2 | 11/2002 | Beyda et al. ............. 379/88.01 |
| 6,654,447 B1 * | 11/2003 | Dewan ......................... 379/76 |
| 6,665,396 B1 | 12/2003 | Khouri et al. .......... 379/266.01 |
| 6,718,017 B1 | 4/2004 | Price et al. ............... 379/88.22 |
| 7,305,070 B2 * | 12/2007 | Kortum et al. ........... 379/88.18 |
| 2004/0042592 A1 * | 3/2004 | Knott et al. .............. 379/88.16 |

* cited by examiner

*Primary Examiner*—Olisa Anwah
(74) *Attorney, Agent, or Firm*—Baker Botts L.L.P.

(57) ABSTRACT

Disclosed is a method for providing communication with an interactive voice response system that includes establishing a communication session between a caller and an interactive voice response system. The communication session includes a call thread. The method includes detecting a pause condition associated with the communication session and pausing the call thread. A pause point in the call thread is determined when the call thread is paused. A reminder message may then be communicated to the caller at predefined intervals. The reminder message may include instructions to the caller for resuming the call thread. The method may also include receiving an indication to resume the call thread and resuming the call thread at the pause point.

26 Claims, 3 Drawing Sheets

FIG. 3

METHOD AND SYSTEM OF PAUSING AN IVR SESSION

TECHNICAL FIELD OF THE INVENTION

This invention relates in general to the field of telecommunications, and more particularly to a method and system of pausing an IVR session.

BACKGROUND OF THE INVENTION

An increasing number of telephone callers communicate with interactive voice response systems during telephone calls. An interactive voice response system provides automated responses to a caller's requests. The caller inputs information using spoken words, tones generated by a telephone, or other methods. In response, the interactive voice response system communicates information through, for example, prerecorded or synthesized messages. Traditional interactive voice response systems disconnect a session with a caller when the caller fails to respond during an allotted time period. This may make it difficult for a caller to attend to another task, such as answering the door or another phone call, that arises while connected with the interactive voice response system. In addition, if a caller gets disconnected, the caller may have to call back into the interactive voice response system and follow the same path the caller followed during the original call. If an interactive voice response system supports real time streaming protocol (RSTP), the caller may be able to pause, rewind, and replay prompts which the caller missed or would like to hear again.

SUMMARY OF THE INVENTION

The present invention provides a method and system for pausing a session with an interactive voice response system that substantially eliminates or reduces at least some of the disadvantages and problems associated with previous methods and systems.

In accordance with one embodiment of the present invention, a method for providing communication with an interactive voice response system includes establishing a communication session between a caller and an interactive voice response system. The communication session includes a call thread. The method includes detecting a pause condition associated with the communication session and pausing the call thread. A pause point in the call thread is determined when the call thread is paused. A reminder message may then be communicated to the caller at predefined intervals. The reminder message may include instructions to the caller for resuming the call thread. The method may also include receiving an indication to resume the call thread and resuming the call thread at the pause point.

In accordance with another embodiment of the present invention, a method for providing communication with an interactive voice response system includes establishing a communication session between a caller and an interactive voice response system. The communication session includes a call thread. A pause condition associated with the communication session is detected. The pause condition includes a disconnection of the communication session between the caller and the interactive voice response system. The call thread is paused, and a pause point in the call thread is determined. The method includes receiving a call from the caller to reestablish the communication session between the caller and the interactive voice response system. The caller is authenticated, and the call thread is resumed at the pause point in response to receiving an indication to resume the call thread.

In accordance with a further embodiment of the present invention, a method for providing communication with an interactive voice response system includes establishing a communication session between a caller and an interactive voice response system. The communication session includes a call thread with a plurality of save points. A pause condition associated with the communication session is detected, and the call thread is paused. The most recent save point that has occurred in the call thread is determined. The method further includes receiving an indication to resume the call thread and resuming the call thread at the determined most recent save point.

In accordance with a particular embodiment of the present invention, a method for providing communication with an interactive voice response system includes establishing a communication session between a caller and an interactive voice response system. The communication session includes a call thread. A pause condition associated with the communication session is detected. The pause condition includes receiving a first signal transmitted by an endpoint indicating that the caller has placed the interactive voice response system on hold. The call thread is paused, and a pause point in the call thread is determined. The method also includes receiving a second signal from the endpoint associated with the caller indicating that the caller has taken the interactive voice response system off hold and resuming the call thread at the pause point.

In accordance with a further particular embodiment of the present invention, a method for providing communication with an interactive voice response system includes establishing a communication session between a caller and an interactive voice response system. The communication session includes a call thread. A pause condition associated with the communication session is detected. The pause condition including determining that the caller has not responded for a predetermined amount of time to a prompt from the interactive voice response system. The call thread is paused, and a pause point in the call thread is determined. The method also includes receiving an indication to resume the call thread and resuming the call thread at the pause point.

Technical advantages of certain embodiments of the present invention include the ability to pause a call thread of a call session in response to a caller placing the interactive voice response system on hold. This may be accomplished by end-to-end hold signaling or by the interactive voice response system recognizing that a question has gone unanswered after a particular period of time. This functionality allows callers to place the interactive voice response system on hold and answer another call without fear that the call will be timed out and disconnected by the interactive voice response system.

Other technical advantages of certain embodiments of the present invention include the ability to resume a call thread of a session which was prematurely disconnected from the interactive voice response system. When a call has been disconnected and is reconnected to the interactive voice response system, the caller may be given an option to resume the call thread from the prior call. The ability to resume a prior call thread can save callers the time and frustration associated with traversing automated menus through which they have already navigated.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
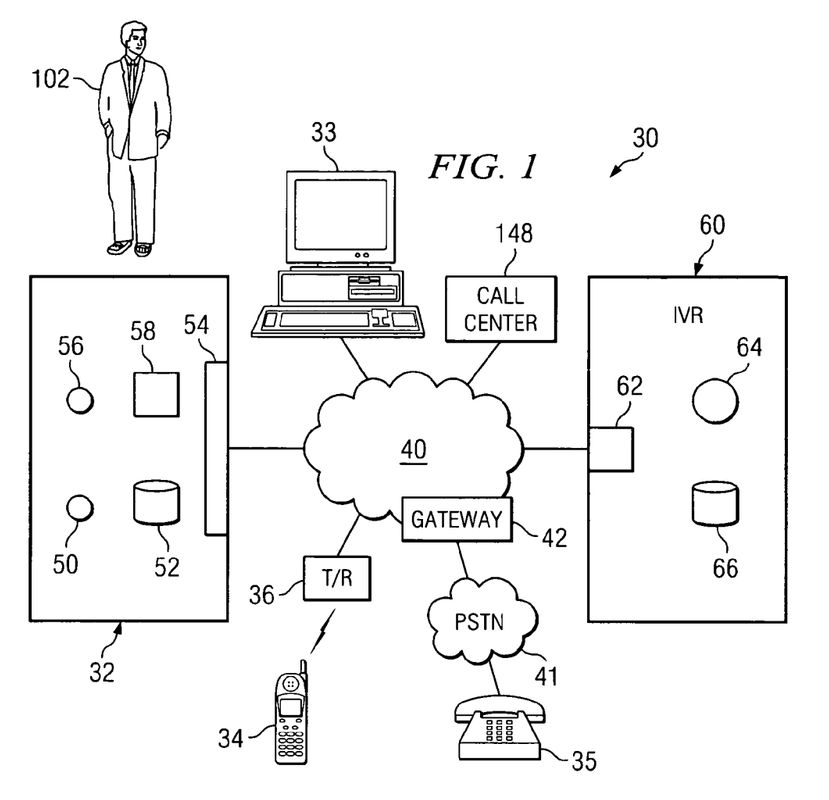
FIG. 1 illustrates a communication system with a plurality of endpoints, a call center, and an interactive voice response system, in accordance with a particular embodiment of the present invention.

FIG. 1 illustrates a communication system 30 including a plurality of endpoints 32-35 having the ability to establish communication sessions with each other and/or an interactive voice response (IVR) system 60. Such communication sessions may be established using communication networks 40, 41 and/or additional endpoints, components or resources coupled with communication networks 40 or 41. IVR system 60 may provide answers to caller questions or may transfer callers to call center 148 when unable to answer. IVR system 60 may provide a caller, such as caller 102 using endpoint 32, with a list of menu options and, based on the caller's responses to the menu options, direct the caller to another menu, request further information from the caller, provide information to the caller, or transfer the caller to an appropriate automated service or human representative.

In accordance with particular embodiments, systems and methods are provided that allow an IVR system 60 to pause a call thread of a session upon detecting a pause condition, such as, for example, a request from caller 102 to pause the session. A session, for example, a voice session, is the active communication connection between IVR system 60 and an endpoint 32-35. The pause conditions detected by IVR system 60 may also include, for example, detecting that caller 102 has placed IVR system 60 on hold, detecting that caller 102 has been disconnected from IVR system 60, or detecting that caller 102 has been nonresponsive to one or more prompts issued from IVR system 60. Either at the request of caller 102, or upon detecting a different pause condition, IVR system 60 may pause an ongoing session with caller 102 and save the call information so the call may be continued at a later time. Particular embodiments allow IVR users to pause a call session at any point in time. Users then have the capability of resuming their call session at the same position in the IVR call script execution that the call session was paused.

Endpoints 32-35 may be any combination of hardware, software and/or encoded logic that provide communication services to a user. For example, endpoints 32-35 may include a telephone, a mobile phone, an IP phone, a computer running telephony software, a video monitor, a camera or any other communication hardware, software and/or encoded logic that supports the communication of media using communication network 40. In the illustrated embodiment, endpoints 32-34 include an internet telephone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and type of endpoints 32-35 capable of communicating with IVR system 60.

In the illustrated embodiment, endpoint 32 includes processor 50, memory 52, network interface 54, codec 56, and user interface 58. User interface 58 may include a microphone, video camera, speaker, keyboard, video display, LCD display and/or other device. In accordance with another embodiment, user interface 58 may be coupled with components that include a microphone, video camera, speaker, keyboard, video display and/or other device, rather than having those components incorporated into endpoint 32. Caller 102 may establish a communication session with IVR system 60 using endpoint 32. Endpoints 33-35 may include similar or identical components to endpoint 32, having similar functionality.

In the illustrated embodiment, IVR system 60 includes network interface 62, processor 64, and memory 66. Processor 64 may be a microprocessor, controller or any other suitable computing device or resource. Memory 66 may be any form of volatile or nonvolatile memory including, without limitation, magnetic media, optical media, random access memory (RAM), read only memory (ROM), removable media or any other suitable local or remote memory component. Processor 64 uses memory 66 to create a call thread and to store call information associated with caller 102. The call thread and call information may be at least partially based on responses from caller 102 received by processor 64 through network interface 62. IVR system 60 receives signals over communication network 40 through network interface 62. The signals are received at processor 64, which determines the proper action to take based on the information contained in the signals, executes those actions, and outputs the correct response.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35 for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 may provide for the communication of packets, cells, frames and/or other portions of information (generally referred to as packets) between and among endpoints 32-35, IVR system 60, and call center 148. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35, IVR system 60, and call center 148, coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between an endpoint 32-35 and IVR system 60 or call center 148 may include the transfer of packets across one or more communication paths, that couple endpoints 32-35 to IVR system 60 and/or to call center 148 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34, IVR system 60, and call center 148 may be IP telephony devices. IP telephony devices have the capability of encapsulating a user's voice (or other inputs) into IP packets so that the voice can be transmitted over network 40. Similarly, IP telephony devices 32-34 may have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.) used in PSTN 41 and translates and/or maps between the IP network addresses and PSTN phone numbers.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
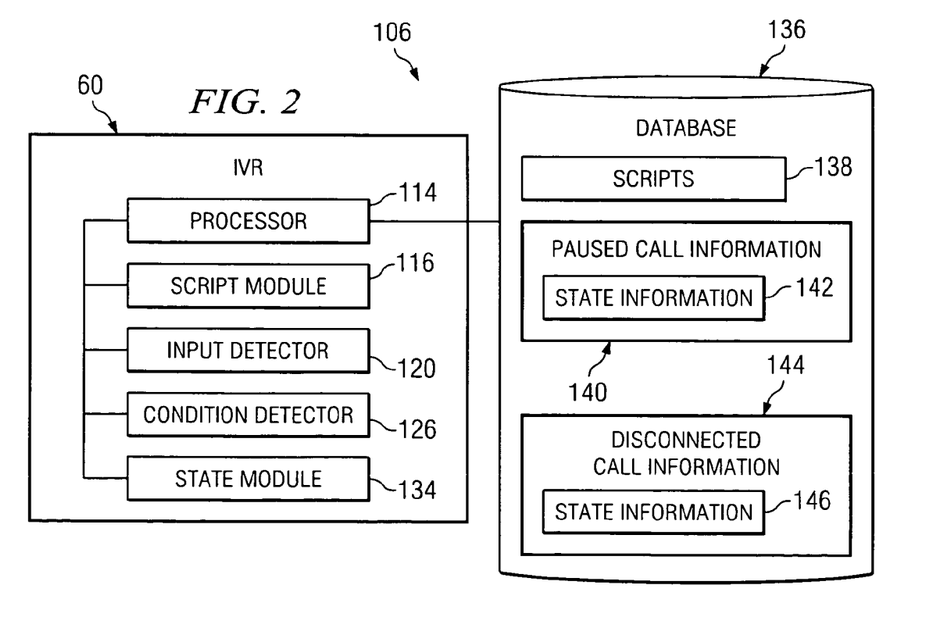
FIG. 2 illustrates the interactive voice response system of FIG. 1, in accordance with a particular embodiment of the present invention.

FIG. 2 illustrates an IVR system 106, in accordance with a particular embodiment. In the illustrated embodiment, IVR system 106 includes a processor 114, a script module 116, an input detector 120, a condition detector 126, a state module 134, and a database 136. Database 136 includes scripts 138, paused call information 140 and disconnected call information 144. Similarly to IVR system 60 of FIG. 1, IVR system 106 is operable to pause a call thread of a call session upon detecting a pause condition, such as, for example, a request from a caller, such as caller 102 of FIG. 1, to pause the session. The call thread is the path that caller 102 takes through available menu choices provided by IVR system 106, along with information collected by IVR system 106 from caller 102. The call thread also indicates at what point caller 102 is in a menu hierarchy and indicates what the next action should be, for example, wait for a response from caller 102, play a prompt to caller 102, or recite a list of menu options to caller 102. A call thread is created when a new communication session is established between a caller and IVR system 106. The call thread grows as the caller and IVR system 106 negotiate through the menu hierarchy. Either at the request of the caller, or upon detecting another pause condition, IVR system 106 may pause the call thread with the caller and may save the call information so the call may be continued at a later time. In addition, any data associated with the call session may be cached by the system.

A caller 102 may input information to IVR system 106 using voice, touchtones, or other suitable signaling method, such as those associated with an endpoint used by the caller to communicate with the IVR system. In a particular embodiment, caller 102 may wish to pause the session with IVR system 106 and may therefore transmit a pause signal to pause the session. To resume the session with IVR system 106, the caller may transmit a resume signal. The pause and resume signals may be transmitted by, for example, pressing a predetermined key to transmit a dual tone multiple frequency (DTMF) signal or a real time streaming protocol (RTSP) or saying a predetermined word if, for example, IVR system 106 includes speech recognition functionality. The predetermined key or word may be unique to IVR system 106 or may be commonly known hot commands that are used with other interactive voice response systems. For example, hot commands may involve the use of a hot key, combination of keys, or hot word. In some embodiments, indications or signals to pause and resume a call thread may be communicated by a combination of methods, such as DTMF signals, RTSP or speech. As an example, a pause indicator may be communicated by a DTMF signal while a resume indicator may be communicated by a spoken word of the caller.

When an IVR script begins execution, it may tell caller 102 that she can press a button on her phone's keypad (such as '1' or '#') or say the word "Pause" anytime to pause her session. After caller 102 pauses her session, IVR system 106 may tell her that she can return to her IVR session by either pressing the same button on the phone's keypad or by saying the words "I'm back." In particular embodiments, the call thread may then continue where it left off.

In one embodiment, caller 102 may establish a connection with IVR system 106 by placing a call to a call center, such as call center 148 of FIG. 1. Call center 148 may be, for example, a customer service center set up to handle customer concerns and/or questions. All calls may initially be forwarded by call center 148 to IVR system 106. If IVR system 106 is unable to help caller 102 or if caller 102 indicates a desire to speak to a human customer service representative, then IVR system 106 is operable to redirect the call to call center 148.

The prompts played by IVR system 106 are determined by script module 116. The call thread may begin by IVR system 106 playing a welcome message to caller 102. IVR system 106 may then request some input from caller 102 such as, for example, an account number or identification code. The information entered by caller 102 is interpreted by processor 114, and script module 116 determines the next prompt to play based on this information. Processor 114 then retrieves the appropriate prompt from scripts 138 in database 136. Processor 114 then converts the prompt into signals or packets that can be communicated to an endpoint used by caller 102. Prompts of scripts 138 may include, for example, requests for information from caller 102 or a list of menu options from which caller 102 may choose.

Caller 102 may communicate a response by speaking or pressing the keys corresponding to the requested information and/or menu options. In particular embodiments, this dialog between caller 102 and IVR system 106 may continue until caller 102 has had all questions or concerns answered or until caller 102 has indicated a desire to speak to a human representative.

At any point during the dialog between caller 102 and IVR system 106, caller 102 may desire to pause the call thread. Caller 102 may speak a predetermined pause command or press a predetermined key, or series of keys, to communicate a pause command to IVR system 106. Input detector 120 determines that caller 102 wishes to pause the session and communicates this to processor 114. Processor 114 then queries state module 134 for the state of the call.

During the execution of the IVR script, at least one of two things may be happening: (1) the script module may be interacting with caller 102 (e.g., playing a prompt to caller 102, collecting DTMF signals from caller 102, collecting voice from caller 102 via speech recognition, etc.), or (2) the system may be doing some backend processing that does not involve direct interaction with caller 102 (e.g., database lookup or account number verification).

In the case that caller 102 elects to pause the session while the system is interacting with the caller and later decides to resume the session, the IVR system could either continue with the interaction at the point at which it left off or re-start the interaction from the beginning. For example, caller 102 elects to pause the session while the system is playing out a prompt to caller 102, then, when caller 102 unpauses, the system could either continue playing the prompt at the point where it left off or replay the prompt from the beginning.

In the case that caller 102 elects to pause the session while the system is doing something other than interacting with the caller, IVR system 106 may continue to execute the other action and any following non-interacting actions until an interacting action should be executed. Once the flow of execution of the script has reached a point at which an interacting action with the caller needs to be executed, the call thread may be paused. When caller 102 returns, the call thread continues at that interacting action. This could be beneficial in cases when caller 102 decides to pause while IVR system 106 is, for example, performing a database lookup that takes an extended period of time. If this database lookup were followed by a prompt action, then IVR system 106 may execute the database lookup action but may stop before the prompt action and wait for caller 102 to unpause before continuing the call thread.

State module 134 determines the state of the call between caller 102 and IVR system 106, such as IVR system 106 playing a message to caller 102 or IVR system 106 performing backend processing. If script module 116 is playing a message to caller 102 when a pause indication is received, state module 134 may instruct script module 116 to cease playing the message. If state module 134 determines that processor 114 is conducting backend processing when a pause indication is received, such as, for example, a database lookup or account number verification, state module 134 may allow the backend processing to continue until complete. State module 134 communicates the state of the call to processor 114, when communications to caller 102 have stopped and the backend processing is completed or stopped. After receiving the state information from state module 134, processor 114 communicates the paused call information 140 and the state information 142 of the paused session to database 136 where such information is stored.

State module 134 may contain predetermined save points. The predetermined save points may be locations in the call thread at which it may be natural and intuitive to resume paused dialogue between caller 102 and IVR system 106. In particular embodiments, the call script may be written to mark certain points as save points. When caller 102 unpauses, the caller's session may continue at the most recent save point. This gives caller 102 the advantage of continuing the call session at a more natural, intuitive location in the script. An example save point may occur prior to requesting caller 102 to enter a lengthy account number. A save point prior to such an account number entry would enable caller 102 to resume entry the account number from the beginning of the number rather than attempting to resume in the middle of entering the account number. A save point may also occur prior to a prompt requesting entry of the account number. As another example, logical save points may occur after caller 102 has responded to any prompt from IVR system 106.

While the session is paused, IVR system 106 waits for a resume command from caller 102. During this time, script module 116 may play periodic reminder messages to caller 102 to remind caller 102 that the session has been paused. In a particular embodiment, script module 116 may also inform caller 102 of how to resume the call. For example, the system may periodically prompt caller 102 to "say 'I'm back' or press '1' whenever you would like to resume your session." This can be done every few minutes or at any other desired time interval to remind the caller how to resume the call session.

When caller 102 indicates a desire to resume the session, the resume signal such as voice or DTMF signal is detected by input detector 120. Input detector 120 communicates the desire of caller 102 to resume the call to processor 114. Processor 114 retrieves the paused call information 140 and state information 142 from database 136. State module 134 determines the state at which the call was paused and communicates the state information to processor 114 and script module 116. Script module 116 then resumes the call thread where it left off, or at a predetermined save point as determined by state module 134. The call may then continue until caller 102 is satisfied or has been transferred to call center 148.

In a particular embodiment, IVR system 106 may monitor how long a session of caller 102 has been paused. This may allow IVR system 106 to prevent caller 102 from staying in the paused state and using a port indefinitely. After a certain amount of time, such as an amount of time set by the IVR system administrator (e.g., 30 minutes), the system may drop the call and reacquire the port. Condition detector 126 may be operable to determine whether a length of paused time exceeds a time-out length of time. If a session of caller 102 has been paused for a predetermined length of time, for example, 30 minutes or more, condition detector 126 may inform processor 114. Processor 114 may then disconnect caller 102 from IVR system 106 and/or delete the paused call information 140 and state information 142 from database 136. In another embodiment, the paused call information 140 and state information 142 may not be deleted from database 136 and may instead be saved for a period of time in case caller 102 calls back.

In some embodiments, a pause condition may be indicated by using end-to-end hold signaling. Condition detector 126 may detect a hold signal, rather than a pause command, transmitted by an endpoint associated with caller 102. For example, caller 102 may place the IVR system on hold (such as by pressing a "Hold" key in the caller's endpoint) as opposed to inputting a pause command to pause the call thread. Condition detector 126 may then indicate to processor 114 that IVR system 106 has been placed on hold. After receiving this indication, processor 114 may automatically pause the call thread and save paused call information 140 to database 136. Condition detector 126 may also be capable of detecting when IVR system 106 has been taken off hold. Condition detector 126 can communicate this to processor 114, and processor 114 may resume the call thread.

In particular embodiments, processor 114 may pause an active call thread between caller 102 and IVR system 106 after caller 102 has failed to respond to one or more prompts from IVR system 106. IVR scripts may often prompt caller 102 for information and wait for a response. If caller 102 does not respond after, for example, three consecutive queries, IVR system 106 may pause the session instead of continuously prompting caller 102. This solution may be more efficient than playing unnecessary media to caller 102. Condition detector 126 may indicate that several prompts from script module 116 have gone unanswered by caller 102. This information may be communicated to processor 114, which may pause the call thread and save paused call information 140 to database 136. Script module 116 may then periodically play prompts to caller 102 to indicate that the call has been paused and instruct caller 102 how to resume the call. In an alternative embodiment, script module 116 may not play any instructions to caller 102. Instead, any touchtone or spoken communication from caller 102 may be detected by input detector 120 and input detector 102 may then instruct processor 114 to resume the paused call thread.

In some embodiments, caller 102 may not indicate a desire to pause the call thread but may become disconnected from IVR system 106. When a user actively disconnects or is disconnected from an IVR session, IVR system 106 may pause the script. If caller 102 calls back within a certain amount of time (e.g., 30 minutes), IVR system 106 may authenticate caller 102 and give caller 102 the option of either resuming the previous paused call session at the point at which caller 102 disconnected, or starting the call thread from the beginning. Condition detector 126 may detect that caller 102 has become disconnected from IVR system 106. Condition detector 126 may communicate this indication to processor 114, which may pause the call thread. State module 134 will indicate the state of the call at the time of disconnection, to processor 114, and processor 114 will save disconnected call information 144 and state information 146 in database 136.

When new calls are received at IVR system 106, processor 114 may check the disconnected call information 144 of database 136 to determine if the new call may be a reconnection of a disconnected call, such as identifying the caller as one whose call session was prematurely disconnected and paused. If processor 114 determines that the new call is a reconnection of a disconnected call, processor 114 may communicate this determination to script module 116. Script module 116 may then execute a script inquiring of the caller whether the caller wishes to resume the previous call thread or start a new call thread. If the caller indicates a desire to resume the previous call thread, processor 114 retrieves the disconnected call information 144 and state information 146 from database 136 and resumes the call thread. If the caller 102 indicates a desire not to resume the previous call thread, then a new call thread may be initiated. Processor 114 may recognize caller 102 by authenticating caller 102. Authentication could occur by any suitable method, including, for example, verifying a cookie deposited at an endpoint associated with caller 102, receiving an identification password from caller 102, or identifying the phone number of an endpoint associated with caller 102 by phone number detection.

It will be recognized by those of ordinary skill in the art that IVR systems in accordance with particular embodiments may include any number of processors or memory or other modules to accomplish the functionality and features described herein. The use of script module 116, input detector 120, condition detector 126, and state module 134 to illustrate pausing a call thread for later resumption and other features is for example purposes only, and the ability to pause and resume a call session and perform other features may be implemented using any suitable type of communication hardware, software and/or encoded logic. In addition, any processors, memory, or other modules used, such as processor 114, script module 116, input detector 120, condition detector 126, state module 134, and database 136, may be centrally located (local) with respect to one another or distributed throughout a communication network or system.

Figure 3:
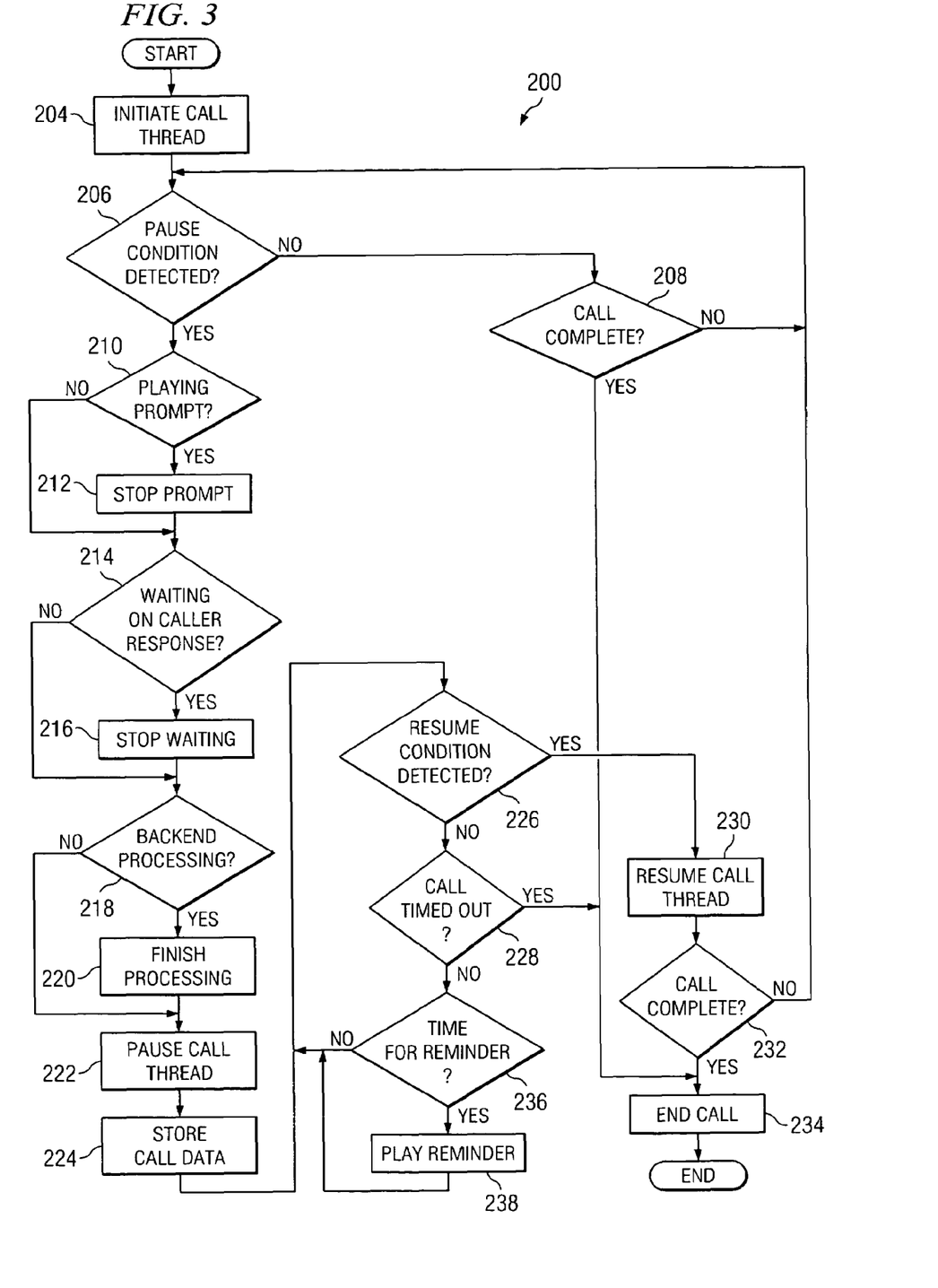
FIG. 3 illustrates a method for providing communication with an interactive voice response system when a pause condition is detected, in accordance with a particular embodiment of the present invention.

FIG. 3 is a flowchart 200 illustrating a method for providing communication with an IVR system, in accordance with a particular embodiment. When a call is initiated between a caller 102 and IVR system 106, IVR system 106 may initiate the call thread at step 204. A dialog may ensue between caller 102 and IVR system 106 until a pause condition is detected or the call is completed at steps 206 and 208, respectively. If no pause condition is detected, the call continues until it is complete. If it is determined at step 208 that the call is complete, then the call will be ended at step 234.

A pause condition may be detected by condition detector 126. A pause condition may include, for example, detecting that caller 102 wishes to pause the session, that IVR system 106 has been put on hold by caller 102, that caller 102 is non-responsive to inquiries presented by script module 116, or that caller 102 has been disconnected from IVR system 106.

If it is determined at step 206 that a pause condition is detected, state module 134 determines if a prompt is playing at step 210. If a prompt is playing to caller 102, the prompt is stopped at step 212. At step 214 it is determined whether IVR system 106 is waiting on a response from the caller. If so, IVR system 106 stops waiting at step 216. At step 218 it is determined whether backend processing is occurring. If backend processing is occurring, the processing is finished at step 220. The call thread is then paused at step 222, and the call data is stored at step 224.

IVR system 106 will remain in this paused state until a resume condition is detected at step 226 or until the paused session times out. If no resume condition has been detected at step 226, condition detector 126 checks to see if the paused session has been timed out at step 228. If the paused session has been timed out, the paused session is ended at step 234. If the paused session has not been timed out, script module 116 determines if it is time to play a reminder message at step 236. In one embodiment, script module 116 may be configured to play a reminder message and/or instructions regarding resuming the call thread once every 30 seconds. If a preset time has passed, the reminder is played at step 238. IVR system 106 continues playing these reminders at the preset intervals until a resume condition is detected or the call has been timed out.

The resume condition detected at step 226 may depend on the pause condition which was previously detected at step 206. If the pause condition at step 206 was an indication from caller 102 that he/she desired to pause the call thread, then the resume condition could be a spoken or touch-tone command to resume the call thread. If the pause condition detected at step 206 was a hold signal, then the resume condition may be a detection that IVR system 106 has been taken off hold. If the pause condition at step 206 was a lack of response from caller 102 to inquiries from IVR system 106, then the resume condition may be any spoken or touch-tone input from caller 102. If the pause condition included detecting that caller 102 had been disconnected from IVR system 106, then the resume condition may be detecting that caller 102 has been reconnected.

When a resume condition is detected, processor 114 resumes the call thread at step 230. The dialog may continue between caller 102 and IVR system 106 until the call is complete. Processor 114 determines if the call is complete at step 232. If the call is not complete, the call is continued until another pause condition is detected or until the call is complete. In one embodiment, caller 102 may pause the call as many times as desired. In some embodiments, each call may be allotted a limited number of pauses.

Figure 4:
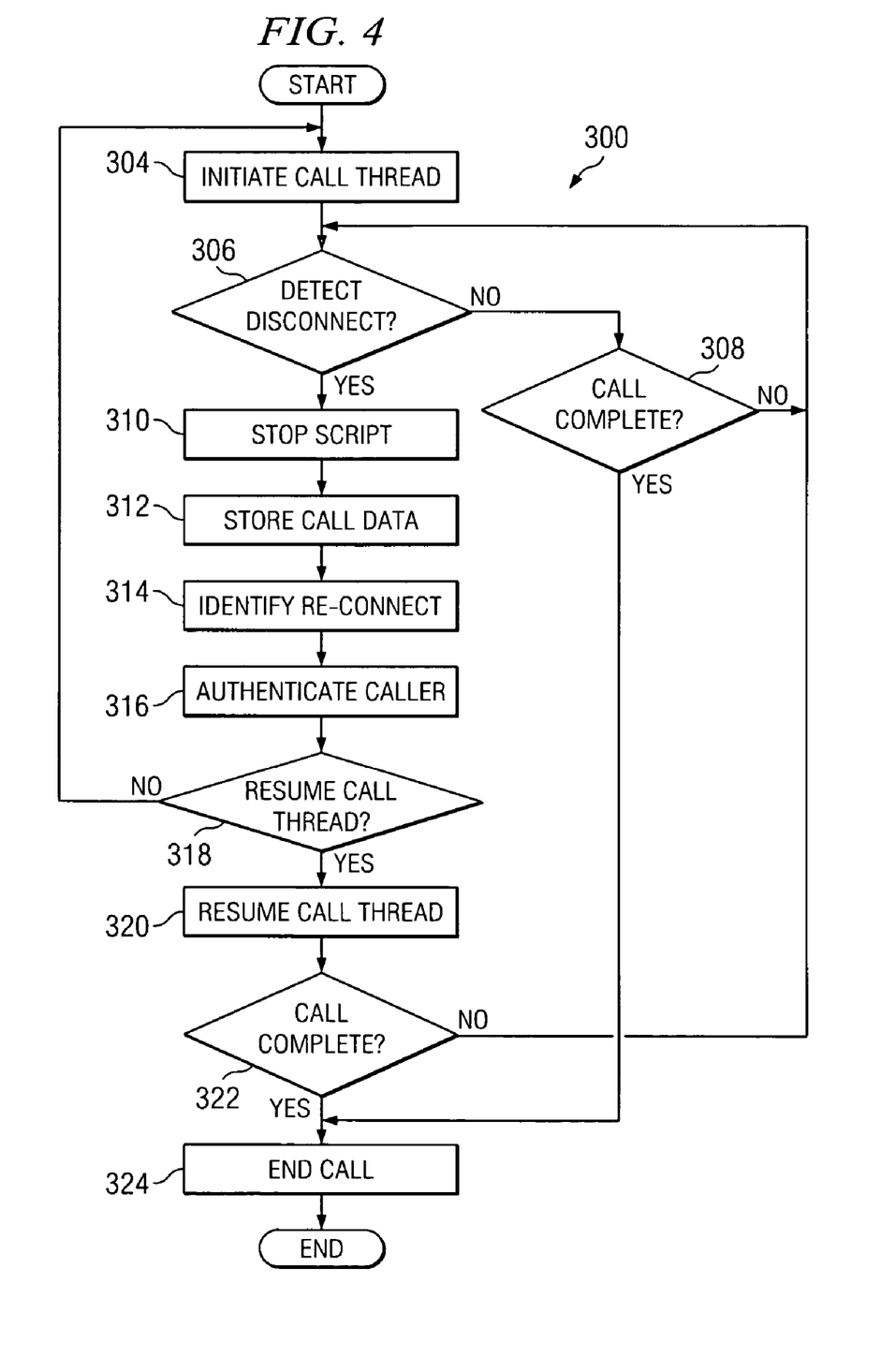
FIG. 4 illustrates a method of handling a call to an interactive voice response system when a caller is disconnected from the interactive voice response system, in accordance with a particular embodiment of the present invention.

FIG. 4 is a flowchart 300 illustrating, in accordance with a particular embodiment, a method of processing a disconnect and reconnect of a caller. The method begins with processor 114 and script module 116 initiating the call thread at step 304. The dialog between caller 102 and IVR system 106 may continue until caller 102 is disconnected from IVR system 106.

At step 306, condition detector 126 determines whether the call has been disconnected. If the call is still connected, processor 114 checks to see if the call is complete at step 308. If the call is complete, the call is ended at step 324. If the call is not complete, the method returns to step 306.

If condition detector 126 determines at step 306 that caller 102 has become disconnected from IVR system 106, condition detector 126 informs processor 114 of this condition, and processor 114 instructs script module 116 to stop the script 138 at step 310. State module 134 will report the state of the call to processor 114, and processor 114 will store the disconnected call information 144 and state information 146 in database 136 at step 312.

When caller 102 calls back into IVR system 106, processor 114 identifies caller 102 as a reconnection of a previously disconnected call at step 314. Caller 102 is authenticated at step 316, and a determination of whether or not to resume the call thread of the previous call is made at step 318. In some embodiments, the identification of the caller as a reconnection of a previously disconnected call may be made when the caller is authenticated. In particular embodiments, caller 102 makes the determination whether to resume the previous call thread or to initiate a new call thread. If caller 102 decides to initiate a new call thread, the method returns to step 304. If caller 102 desires to continue the previous call thread, the call thread is resumed at step 320.

At step 322, processor 114 checks to see if the call is complete. If the call is not complete, the dialog between caller 102 and IVR system 106 continues until the call is complete or until another disconnection is detected. In one embodiment, multiple disconnections of caller 102 from IVR system 106 may be detected, the call information may be saved, and the call thread from previous calls may be resumed. In another embodiment, only one disconnection and resumption of a call may be allowed. When the call is complete it is ended at step 324.

Some of the steps illustrated in FIGS. 3 and 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and IVR systems 60 and 106, these elements may be combined, rearranged, or positioned in order to accommodate particular architectures or needs. For example, separate locations are described in memory for paused call information and disconnected call information, however the two sets of information may be contained in a single storage location or may be further subdivided into any number of locations as desired. In addition, the call center and the IVR are illustrated as being remote on the communication network. The IVR may be integral to the call center, or the IVR may have individual components that are remote from each other on the communication network. The present invention contemplates great flexibility in the arrangement of elements as well as their interrelations.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for providing communication with an interactive voice response system, comprising:
   establishing a communication session between a caller and an interactive voice response system, the communication session comprising a call thread, the call thread comprising a plurality of save points;
   detecting a pause condition associated with the communication session, the pause condition comprising determining that the caller has not responded for a predetermined amount of time to a prompt from the interactive voice response system;
   pausing the call thread in response to detecting the pause condition;
   determining a pause point in the call thread when the call thread is paused;
   determining the most recent save point that has occurred prior to the pause point in the call thread;
   receiving an indication to resume the call thread; and
   resuming the call thread at the determined most recent save point in response to receiving the indication to resume the call thread.

2. The method of claim 1, wherein receiving the indication to resume comprises receiving a dual tone multiple frequency (DTMF) signal from the caller to resume the call thread.

3. The method of claim 1, wherein receiving the indication to resume comprises receiving a spoken command from the caller to resume the call thread.

4. The method of claim 1, further comprising repeating the prompt for a predetermined number of iterations before determining that the caller has not responded to the prompt from the interactive voice response system.

5. The method of claim 1, further comprising communicating an informative message to the caller at predefined intervals, the informative message comprising an indication to the caller that the call thread has been paused.

6. The method of claim 1, further comprising communicating a reminder message to the caller at predefined intervals, the reminder message comprising instructions to the caller for resuming the call thread.

7. A method for providing communication with an interactive voice response system, comprising:
   establishing a communication session between a caller and an interactive voice response system, the communication session comprising a call thread, the call thread comprising a plurality of save points;
   detecting a pause condition associated with the communication session, the pause condition occurring at a first point in the call thread;
   determining a next save point in the call thread, the next save point occurring after the first point in the call thread;
   pausing the call thread in response to detecting the pause condition, the call thread paused at the next save point in the call thread;
   receiving an indication to resume the call thread; and
   resuming the call thread at the determined most recent save point in response to receiving the indication to resume the call thread.

8. A method for providing communication with an interactive voice response system, comprising:
   establishing a communication session between a caller and an interactive voice response system, the communication session comprising a call thread, the call thread comprising a plurality of predetermined save points;
   detecting a pause condition associated with the communication session;
   pausing the call thread in response to detecting the pause condition, the call thread paused at a first point in the call thread;
   determining the most recent predetermined save point that has occurred in the call thread prior to the first point in the call thread;
   receiving an indication to resume the call thread;
   automatically resuming the call thread at the determined most recent predetermined save point in response to receiving the indication to resume the call thread; and
   wherein automatically resuming the call thread at the determined most recent predetermined save point in response to receiving the indication to resume the call thread comprises automatically resuming the call thread at the determined most recent predetermined save point in response to receiving the indication to resume the call thread irrespective of a current prompt being played for the caller when the call thread is paused.

9. The method of claim 1:
   further comprising disconnecting the call after pausing the call thread; and
   wherein receiving an indication to resume the call thread comprises receiving a call from the caller to reestablish the communication session between the caller and the interactive voice response system.

10. A system for providing communication with an interactive voice response system, comprising:
    a processor operable to:
      establish a communication session between a caller and an interactive voice response system, the communication session comprising a call thread, the call thread comprising a plurality of save points;
      detect a pause condition associated with the communication session, the pause condition comprising determining that the caller has not responded for a predetermined amount of time to a prompt from the interactive voice response system;
      pause the call thread in response to detecting the pause condition,
      determine a pause point in the call thread when the call thread is paused; and
      determine the most recent save point that has occurred prior to the pause point in the call thread;
    an interface coupled to the processor, the interface operable to receive an indication to resume the call thread; and
    the processor being further operable to resume the call thread at the determined most recent save point in response to receiving the indication to resume the call thread.

11. The system of claim 10, wherein the processor is further operable to repeat the prompt for a predetermined number of iterations before determining that the caller has not responded to the prompt from the interactive voice response system.

12. The system of claim 10, wherein the interface is further operable to communicate an informative message to the caller at predefined intervals, the informative message comprising an indication to the caller that the call thread has been paused.

13. The system of claim 10, wherein the interface is further operable to communicate a reminder message to the caller at predefined intervals, the reminder message comprising instructions to the caller for resuming the call thread.

14. The system of claim 10, wherein the interface operable to receive the indication to resume comprises the interface operable to receive a dual tone multiple frequency (DTMF) signal from the caller to resume the call thread.

15. The system of claim 10, wherein the interface operable to receive the indication to resume comprises the interface operable to receive a spoken command from the caller to resume the call thread.

16. The system of claim 10:
wherein the processor is further operable to disconnect the call after pausing the call thread; and
wherein the interface operable to receive an indication to resume the call thread comprises the interface operable to receive a call from the caller to reestablish the communication session between the caller and the interactive voice response system.

17. A system for providing communication with an interactive voice response system, comprising:
means for establishing a communication session between a caller and an interactive voice response system, the communication session comprising a call thread, the call thread comprising a plurality of save points; pause condition comprising determining that the caller has not responded for a predetermined amount of time to a prompt from the interactive voice response system;
means for pausing the call thread in response to detecting the pause condition;
means for determining a pause point in the call thread when the call thread is paused;
means for determining the most recent save point that has occurred prior to the pause point in the call thread;
means for receiving an indication to resume the call thread; and
means for resuming the call thread at the determined most recent save point in response to receiving the indication to resume the call thread.

18. The method of claim 8, wherein receiving the indication to resume comprises receiving a dual tone multiple frequency (DTMF) signal from the caller to resume the call thread.

19. The method of claim 8, wherein receiving the indication to resume comprises receiving a spoken command from the caller to resume the call thread.

20. The method of claim 8:
further comprising disconnecting the call after pausing the call thread; and
wherein receiving an indication to resume the call thread comprises receiving a call from the caller to reestablish the communication session between the caller and the interactive voice response system.

21. A system for providing communication with an interactive voice response system, comprising:
a processor operable to:
establish a communication session between a caller and an interactive voice response system, the communication session comprising a call thread, the call thread comprising a plurality of predetermined save points;
detect a pause condition associated with the communication session;
pause the call thread in response to detecting the pause condition, the call thread paused at a first point in the call thread; and
determine the most recent predetermined save point that has occurred in the call thread prior to the first point in the call thread;
an interface coupled to the processor, the interface operable to receive an indication to resume the call thread;
the processor being further operable to automatically resume the call thread at the determined most recent predetermined save point in response to receiving the indication to resume the call thread; and
wherein the processor further operable to automatically resume the call thread at the determined most recent predetermined save point in response to receiving the indication to resume the call thread comprises the processor further operable to automatically resume the call thread at the determined most recent predetermined save point in response to receiving the indication to resume the call thread irrespective of a current prompt being played for the caller when the call thread is paused.

22. The system of claim 21, wherein the interface operable to receive the indication to resume comprises the interface operable to receive a dual tone multiple frequency (DTMF) signal from the caller to resume the call thread.

23. The system of claim 21, wherein the interface operable to receive the indication to resume comprises the interface operable to receive a spoken command from the caller to resume the call thread.

24. The system of claim 21:
wherein the processor is further operable to disconnect the call after pausing the call thread; and
wherein the interface operable to receive an indication to resume the call thread comprises the interface operable to receive a call from the caller to reestablish the communication session between the caller and the interactive voice response system.

25. Computer-readable medium encoding software for providing communication with an interactive voice response system, the software when executed operable to perform operations comprising:
establishing a communication session between a caller and an interactive voice response system, the communication session comprising a call thread, the call thread comprising a plurality of save points;
detecting a pause condition associated with the communication session, the pause condition comprising determining that the caller has not responded for a predetermined amount of time to a prompt from the interactive voice response system;
pausing the call thread in response to detecting the pause condition;
determining a pause point in the call thread when the call thread is paused;
determining the most recent save point that has occurred prior to the pause point in the call thread;
receiving an indication to resume the call thread; and
resuming the call thread at the determined most recent save point in response to receiving the indication to resume the call thread.

26. Computer-readable medium encoding software for providing communication with an interactive voice response system, the software when executed operable to perform operations comprising:
establishing a communication session between a caller and an interactive voice response system, the communication session comprising a call thread, the call thread comprising a plurality of predetermined save points;
detecting a pause condition associated with the communication session;
pausing the call thread in response to detecting the pause condition, the call thread paused at a first point in the call thread;
determining the most recent predetermined save point that has occurred in the call thread prior to the first point in the call thread;
receiving an indication to resume the call thread;

automatically resuming the call thread at the determined most recent predetermined save point in response to receiving the indication to resume the call thread; and wherein automatically resuming the call thread at the determined most recent predetermined save point in response to receiving the indication to resume the call thread comprises automatically resuming the call thread at the determined most recent predetermined save point in response to receiving the indication to resume the call thread irrespective of a current prompt being played for the caller when the call thread is paused.

* * * * *